United States Patent [19]
Rasch

[11] 3,958,454
[45] May 25, 1976

[54] PORTABLE TESTING APPARATUS FOR TESTING OF FLUID-OPERATED BRAKE SYSTEMS

[75] Inventor: Gerhard Rasch, Ginsheim-Gustavsburg, Germany

[73] Assignee: Flughafen Frankfurt/Main Aktiengesellschaft, Frankfurt am Main, Germany

[22] Filed: June 9, 1975

[21] Appl. No.: 585,292

[52] U.S. Cl. ................................................. 73/121
[51] Int. Cl.² ......................................... G01L 5/28
[58] Field of Search .............. 73/121, 123, 126, 168

[56] References Cited
UNITED STATES PATENTS

| | | | |
|---|---|---|---|
| 3,312,104 | 4/1967 | Hegenbart | 73/123 |
| 3,772,914 | 11/1973 | Pohl et al. | 73/121 |

Primary Examiner—Jerry W. Myracle
Attorney, Agent, or Firm—Michael J. Striker

[57] ABSTRACT

A housing of the apparatus has a device for connection to a source of pressurized air, and is provided with first and second connectors for connection to brake system lines. A compressed air tank is located in the housing, and at least three double manometers are provided. Fluid couplings are connected with the manometers. A first fluid line connects the air tank with the device and has a one-way valve and an adjustable pressure regulator interposed in it, a second fluid line connects the air tank with the first connector, and a third fluid line connects the air tank with the second connector and has a one-way valve interposed in it. A multi-position manually operable air spring regulating valve is interposed in the second line and has a valve body, an operating handle for moving the valve body between two operative end positions and a centering-spring arrangement for centering the handle in a rest position in which the valve body is in an intermediate blocking position. A control arrangement is connected in circuit with the air spring valve and connects the air spring and the first connector. This control arrangement includes a one-way valve and a blocking valve intermediate the air tank and the first connector and another blocking valve intermediate the air tank and the second connector.

8 Claims, 6 Drawing Figures

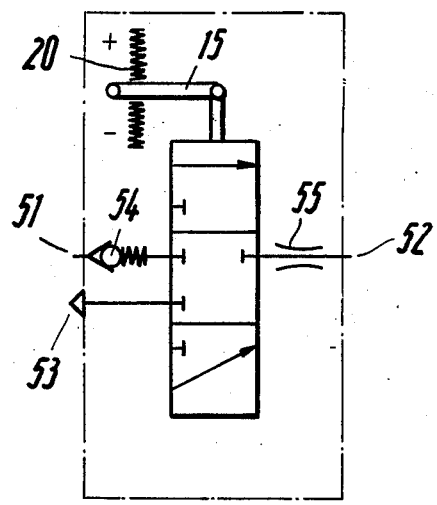
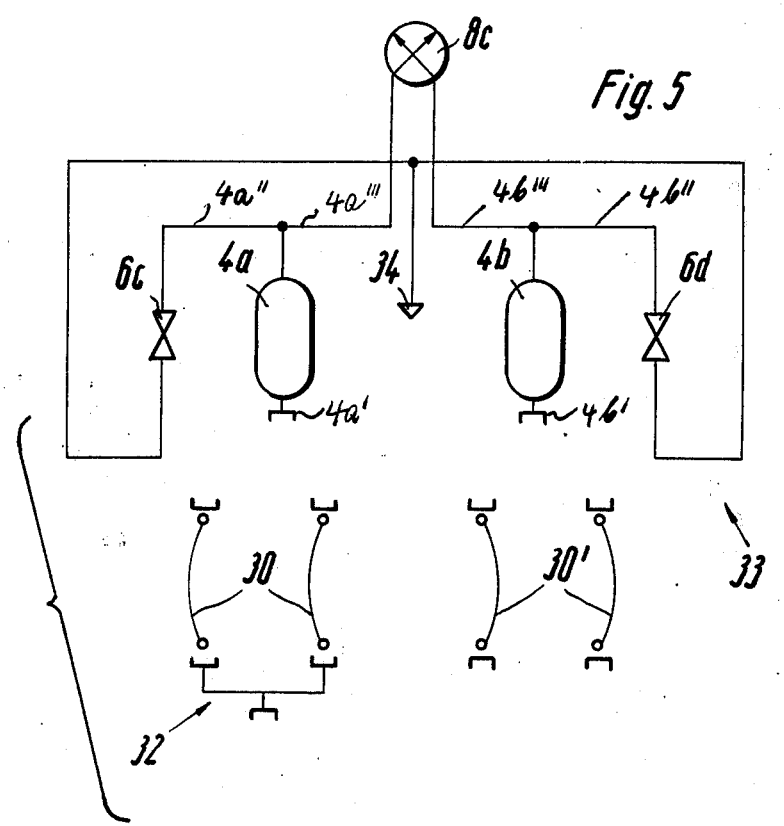

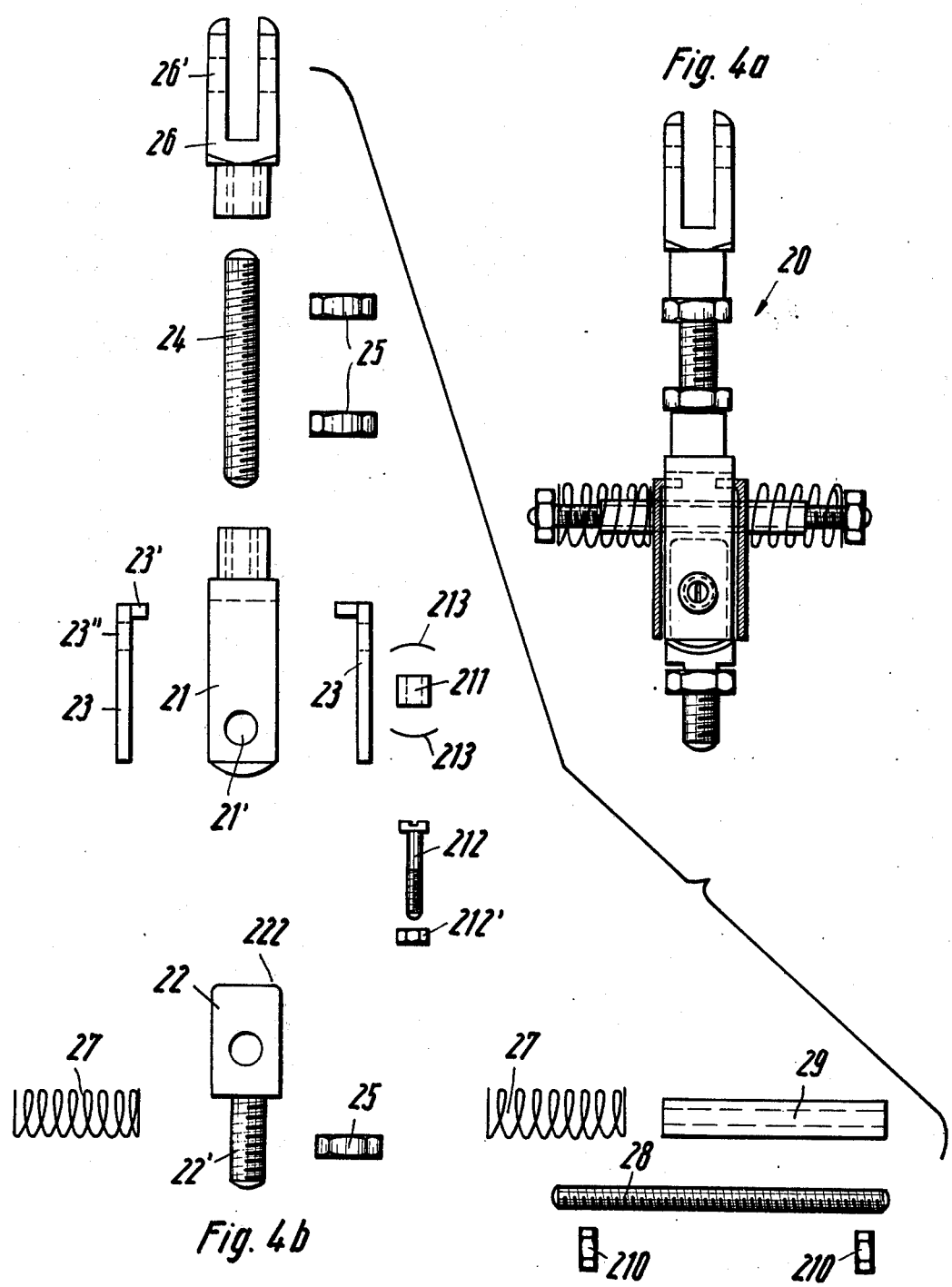

PORTABLE TESTING APPARATUS FOR TESTING OF FLUID-OPERATED BRAKE SYSTEMS

BACKGROUND OF THE INVENTION

The present invention relates to a testing apparatus in general, and more particularly to a testing apparatus for testing of fluid-operated brake systems, particularly for brake systems of land-based vehicles. Still more particularly, the invention relates to a portable testing apparatus of this type.

It is known that the brake circuits of vehicles and of trailers must be periodically checked for safety reasons, and that many countries require a periodic examination of these brake systems by law. During such examinations the braking effectiveness is tested in percent of braking or retardation in $m/sec.^2$. In addition, however, it is important to examine the brake system and its functioning, in addition to carrying out the actual braking test with it. For example, compressed-air brake systems such as are used on trailers or the like, must undergo the following tests:

Measurement of the pressure drop when the system is filled (to determine the tightness of the system);
measurement of the pressure drop at the storage and brake cylinders under partial brake pressure;
measurement of the brake pressure at vented trailer control line (1-circuit system) or during pressure drop in the storage line (2-circuit system);
measurement of the pressure drop in the air tank during each full braking incident;
piston stroke of the brake cylinders during each full braking incident;
position of the piston rods of the brake cylinders on releasing of the brake;
measurement of the pressure in the control line of the trailer brake valve;
measurement of the response stages and the adjustability of the trailer brake valve (at pressure drop in the control line in the case of an indirectly operating trailer brake valve or at pressure increase in the brake line in the case of a direct acting trailer brake valve);
operation of the brake light switch;
measurement of the pressure at the load sensing valve for different settings;
measurement of the opening pressure of the overflow valve between two air tanks.

Analogous tests are also carried out on the self-propelled vehicles having such brake systems, for example tractors of the like.

To be able to readily test compressed air brake systems, hydraulic brake systems or combined brake systems it has been proposed to provide a movable test stand which is to be connectable with a source of air pressure that is independent of the motor vehicle to be tested. However, for various reasons it has been found that this prior-art proposal was not workable and not satisfactory, and in addition that it was very heavy and required large amounts of space and was therefore not suitable for universal application. Another disadvantage was that it was not possible for a single operator to operate the controls of the test stand as well as to be in a position to visually supervise the elements being tested on the vehicle and/or to be able to carry out adjustments on or near these elements.

SUMMARY OF THE INVENTION

Accordingly, it is an object of this invention to overcome the disadvantages of the prior art.

More particularly it is an object of this invention to provide a portable testing apparatus for testing of fluid-operated brake systems which is capable of testing both single-circuit and multi-circuit fluid operated brake systems and overcomes the aforementioned disadvantages.

Another object of the invention is to provide such an improved portable testing apparatus which is independent of a vehicle-supplied source of compressed air.

An additional object of the invention is to provide such a testing apparatus which can be operated readily, reliably and very simply, and which makes it possible for a single person to carry out the necessary tests while being within visual and operational range of the components being tested.

In keeping with these objects, and with others which will become apparent hereafter, one feature of the invention resides, in a portable testing apparatus for testing of fluid-operated brake systems, particularly brake systems of land vehicles, in a combination which comprises a housing having a device for connection to a source of pressurized air, and first and second connectors on this housing for connection to brake system lines. A compressed air tank is located in the housing and at least three double manometers are provided. Fluid couplings are connected with these manometers. A first fluid line connects the air tank with the device and has a one-way valve and an adjustable pressure regulator interposed in it. A second fluid line connects the air tank with the first connector, and a third fluid line connects the air tank with the second connector and has a one-way valve interposed in it. A multi-position manually operable air spring regulating valve is interposed in the second line and has a valve body, an operating handle for moving the valve body between two operative end positions, and a centering-spring arrangement for centering the handle in a rest position in which the valve body is in an intermediate blocking position. A control arrangement is provided, connected in circuit with the air spring valve and also connected with the air tank and the first connector. The control arrangement includes a one-way valve and a blocking valve intermediate the air tank and the first connector and another blocking valve intermediate the air tank and the second connector.

The one of the two connectors is advantageously constructed as a coupling and provided with a valve, and the other of the two connectors is advantageously a non-valved coupling head. The use of these coupling heads makes possible a rapid connecting of the apparatus to the control lines (single-circuit brake system) which are usually provided with cooperating coupling heads, or to brake and storage lines (two-circuit brake system) on trailer vehicles.

The invention provides a significant reduction in the number of the individual components required for an effective and workable testing apparatus of the type in question, and makes possible the use of a testing apparatus which is small in dimensions and light in weight.

The use of a simple and reliable testing apparatus, which is easy to operate, makes it possible to produce the testing apparatus at relatively low expense and thus brings this testing apparatus within reach of all potential users, such as garages or the like, as well as for state inspection stations. Moreover, the testing apparatus of the present invention is so small, light in weight and simple to operate that it can be carried along in police cars for roadside tests, provided only that a container of compressed air is also brought along. The testing apparatus of the present invention is also suitable for testing individual components of a compressed-air brake system which have been dismounted from the vehicle and are to be separately tested. Such components, or components which require tested before they are installed in the vehicle, can be mounted in a simple jig and can then be tested with the apparatus of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a diagram illustrating the air spring valve used in the apparatus of FIGS. 1 and 2;

FIG. 4a is a simplified perspective illustrating a centering arrangement for the air spring valve of FIG. 3;

FIG. 4b shows the centering arrangement of FIG. 4a in exploded illustration; and FIG. 5 is a diagram illustrating an auxiliary device for use with testing apparatus of the present invention.

DESCRIPTION OF THE PREFERRED EMBODIMENTS

Figure 1:
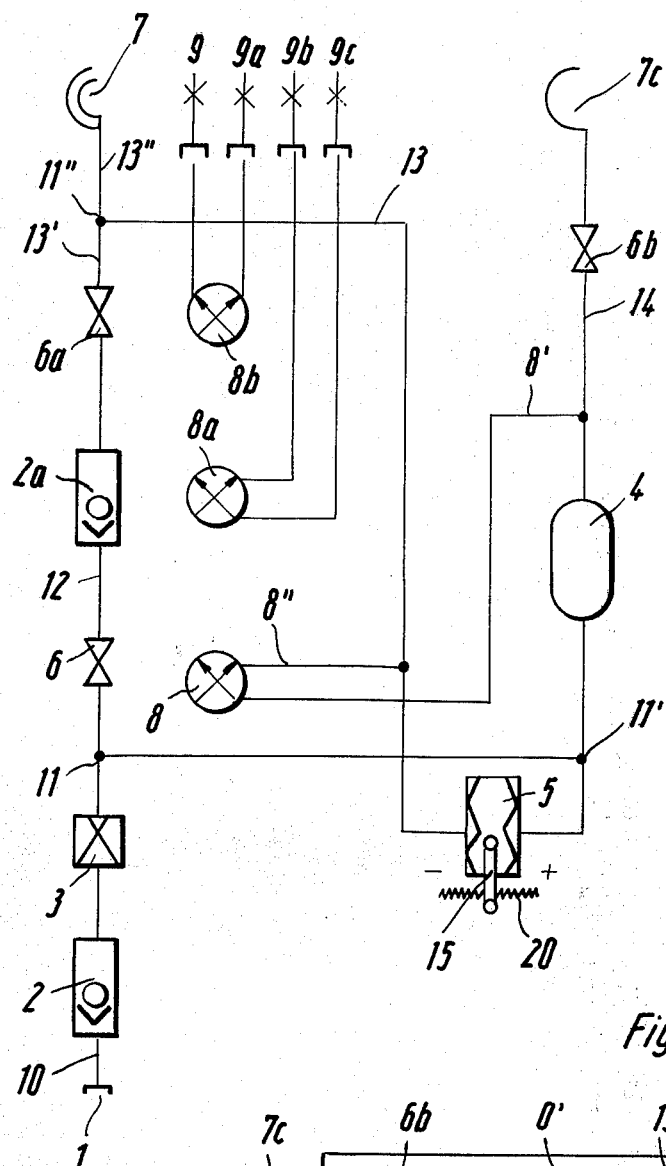
FIG. 1 is a diagram illustrating an embodiment of the testing apparatus of the present invention.
Figure 2:
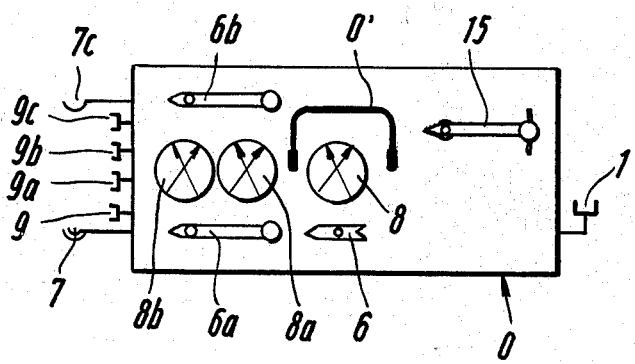
FIG. 2 is a somewhat simplified top-plan view of the apparatus of FIG. 1.

Referring firstly to FIGS. 1 and 2 it will be seen that reference numeral 1 identifies a connecting device by means of which the apparatus of the present invention is to be connected to a source of compressed air other than a source present in a motor vehicle or trailer, for example a supply line that is present in a garage or a container or tank of compressed air. Thus, the apparatus of the present invention can be supplied with compressed air for its testing operations. The device 1 is mounted at one end of the housing O which is provided with a handle O' so that it can be readily carried. At the opposite end of the housing O there are provided first and second connectors 7, 7c; these could of course be located elsewhere. They are constructed as coupling heads of which the head 7 is of the type having a built-in valve that opens when it is connected to a brake line, and the head 7c is a non-valved coupling head. They serve for rapid coupling, for example to the control line or the brake and storage lines of trailers or the like. The fluid couplings 9, 9a, 9b and 9c serve for connection to individual components of the brake system which are to be tested. The arrangement of the coupling heads 7, 7c and of the fluid couplings 9, 9a, 9b and 9c is such (compare FIGS. 1 and 2) that errors in connection are reliably avoided.

The device 1 is connected via a line 10 in which a one-way valve 2 and a pressure regulator 3 are interposed, the latter being ajustable and serving for setting the desired operating pressure, with a T junction 11. The junction 11 is connected with a valve 6 which can be bled, and with a further T-junction 11' which in turn is connected with an air tank 4 and with a finally adjustable air spring valve 5 having an operating handle 15 which is spring centered in the zero position of the valve, as will be described later with respect to FIGS. 3 and 4. The pressure regulator 3, which reduces the pressure of the incoming compressed air to the desired operating pressure, and which maintains the operating pressure largely constant, is here constructed as a pressure limiting device without bleeding function which is provided with a manually operable setting screw acting upon a spring, for setting the desired working or operating pressure.

A line 12 leads from the blocking valve 6 via a one-way valve 2a to a further blocking valve 6a which is also capable of being bled. A line 13' leads from the valve 6a to a T-junction 11' and a further line 13" leads from the junction 11" to the coupling head 7. The T-junction 11" connects the line 13' with a line 13 which extends parallel to the line 12 and is connected with the valve 5; the lines 13', 13 are connected with the coupling head 7 via the line 13". The use of a coupling head 7 with the built-in valve mentioned earlier is advantageous, since the control lines of trailers (having a single-circuit brake system) are usually provided with a coupling head having a pin which, when it comes into engagement with the valve of the coupling head 7, automatically opens this valve, so that a rapid connection and disconnection via the coupling head 7 is assured.

The air tank 4 may have a desired working volume, for example of 3.6 liters, and it is connected via a line 14 with a blocking valve 6b that can be bled, and from there with the coupling head 7c which is preferably of the non-valved type. The apparatus is provided with three double manometers 8, 8a and 8b, each having two individual manometers one of which has a red indicator and the other of which has a white indicator. The manometer with the red indicator which constitutes a part of the double-manometer 8 is connected via a line 8' to the line 14 intermediate the blocking valve 6b and the air tank 4; the manometer having the white indicator and constituting a part of the double-manometer 8 is connected via a line 8" to the line 13 intermediate the valve 5 and the T-junction 11". The individual manometers of the double manometers 8a and 8b are in communication with the fluid couplings 9, 9a, 9b and 9c.

When the apparatus of the present invention is connected via the device 1 to a source of compressed air it is ready for operation when the manometer having the red indicator and constituting a part of the double-manometer 8, indicates the working pressure that is desired. In this condition the compressed air supplied via the device 1 acts upon the closed blocking valve 6b, at the inlet side of the spring 5 and with the valve 6 open acts upon the blocking valve 6a.

Details of the air-spring valve 5 will now be described with reference to FIGS. 3, 4a and 4b.

The air spring valve 5 is an undampened valve which is to be manually operated via the pivotable handle 15. The main air spring valve results from the fact that it is used in motor vehicles, such as in passenger cars, trucks, buses and the like, to regulate the height at which the vehicle chassis is located above the ground, i.e. to regulate air pressure in the air springs of such vehicles, in order to assure that, independently of the loading of the vehicle with passengers or goods, the chassis will always be spaced from the road surface by an identical distance. Thus, such valves 5 are already known, and well known in the art.

FIG. 3 shows in simplified form that the valve 5 has a valve body provided with three controlled ports, namely the inlet port 51 with a one-way valve 54, the outlet port 52 ahead of which there is provided a throttle 55, and the venting port 53 for venting to the ambient atmosphere. The valve body can move between three operating positions, namely the charging position indicating by the symbol + the discharge in position or venting position indicated by the symbol − and the zero or center position which is shown in FIG. 3 and at which all three of the ports are blocked. The handle 15, and hence the valve body with which the handle 15 is connected, is permanently biased to this center position, the biasing effect taking place rapidly and reliably as soon as the user removes his hand from the handle 15, due to the presence of the spring centering arrangement 20.

Details of an embodiment of such a spring centering arrangement 20 are shown in FIGS. 4a and 4b which show the arrangement in assembled and in exploded views, respectively. The centering arrangement 20 has a block 22 which is to be rigidly mounted on or in the housing O of the apparatus, for example by means of screws or the like. The block 22 is bounded essentially of two pairs of parallel surfaces extending at right angles to one another and is provided at one end with a threaded projecting 22 so that it can be secured on the housing O. The upper end of the block 22 is connectable via an intermediate member 24 with a bifurcated head 26 which serves to secure the operating handle 15, for example by means of a pin arranged in openings 26'. The intermediate member 24 is a threaded bolt which is threaded into the bifurcated head 26 and into a further bifurcated member 21 and which is retained by suitable nuts 25. The block 22 is pivotally connected with the bifurcated member 21 in that it is located between the arms of the bifurcated member 21 and a head screw 212 is pushed through openings 21' in the bifurcated member 21 and a passage 22' in the block 22 and secured by a nut 212'. A sleeve 211 is pushed onto the center portion of the screw 212 and retained at opposite axial ends of axial displacement by spring washers 213.

The restoration of the bifurcated member 21 with reference to the stationary block 22 takes place under the action of spring-biased pressure plates 22. In the zero position of the valve 5 which is illustrated in FIG. 3, i.e. in a position of member 21 and block 22 in which the outer surfaces of the block 22 and of the arms of the member 21 which extend normal to the pivoting plane are flush in engagement with the pressure plates 23 which are pressed against them by means of the pressure springs 27. To prevent a turning of the pressure plates 23 with reference to these surfaces, the pressure plates 23 are provided with respective noses 23' which extend into the slot formed at the opposite lateral sides of the block 22 between the arms of the bifurcated member 21.

The pressure plates 23 are provided with holes 22" and a bolt 28 onto which a sleeve 29 (preferably of synthetic plastic material) is pushed, extends through the holes 22" and has opposite end portions projecting outwardly beyond the pressure plates 23 and which are provided at least at their end regions with screw threads. Nuts 210 are threaded onto these screw threads to determine the outer end position of the pressure springs 27. This spring centering arrangement 20 provides for the operating handle 15 of the air spring valve 5 with its response stages (in minutes of arc) a fine response setting in the direction towards admission of air (+) as well as in the direction of venting of air (−).

The apparatus of the present invention will now be described with reference to three examples of use, to facilitate its understanding.

EXAMPLE I

If the apparatus of the present invention is to be used to test a single-circuit brake system of a trailer the trailer control line is to be coupled with the coupling head 7. The connectors of the components to be tested, for example nipples on the brake cylinders, are to be connected with the fluid couplings 9, 9a, 9b and 9c. The pressure regulator 3 is now operated to set the working pressure at which the vehicle system is to be tested, and the red-indicator part of the double-manometer 8 is observed until it indicates that the desired operating pressure has been reached. The apparatus is now ready for use.

It is now merely necessary to open the valve 6 so that compressed air is admitted to the component being tested, e.g. a brake cylinder. The red-indicator manometer of the double-manometer 8 will initially indicate a pressure decrease. However, as additional air becomes admitted into the component being tested, the red indicator rises, as well as the white indicator of the double-manometer 8, until they both indicate the preset operating pressure that was set with the pressure reducer 3. This can be readily determined with a single glance.

If now the blocking valve 6a is closed, the trailer control line of the component being tested is completely vented, since the blocking valve 6a is of the type that can be vented, and an immediate braking operation is initiated in the component being tested, via the direct operating trailer brake valve. The white-indicator part of the double-manometer 8, which is connected to the so-called control impulse line 13, 13', 13", drops to zero value and the double manometers 8a and 8b indicate the pressures and the braking forces as well as the compressed air consumption of the component being tested. If necessary or desired this can be repeated without danger of any pressure drop.

EXAMPLE II

If the apparatus is to be used for testing a trailer having a two-circuit brake system the valves 6a and 6b must be closed and the connections between the apparatus and the component to be tested must be effected. The coupling heads 7 and 7c are to be connected with the control line and the reserve line of the component, respectively, if necessary using intermediate elements to establish such connection, and the fluid couplings 9, 9a, 9b and 9c are to be connected to the appropriate nipples or other connectors of the component to be tested. When the working pressure has been set via the pressure reducer 3, at which time the operator will again observe the red-indicator part of the manometer 8a, the valve 6b is opened to supply compressed air to the component being tested. When the component is filled with compressed air and at the initial pressure drop at the indicator part of the double-manometer 8 is followed by a rise of the indicator to the working pressure, the filling of the component with compressed air is completed.

In order to now similate the condition that would obtain in the event that the connection of the vehicle trailer brake system would become suddenly disengaged from the supply line of compressed air, the valve 6b is closed, resulting in venting of the line to the trailer brake valve, and the direct acting trailer brake valve triggers the emergency braking action of the component being tested. If the valve 6b is open, the braking operation is reversed.

When the valve 6a is open, then a "direct" control impulse is supplied to the component being tested via the control line with which the coupling head 7 is coupled, and this control impulse is of course thus supplied to the trailer brake valve, with the result that at a certain control pulse pressure the brake system of the component being tested will operate. A certain setting of the control pulses to be supplied can be effected by operating the valve 6a and the white-indicator part of the double-manometer 8 can be observed to see the reactions of the system. During this operation the double-manometers 8a and 8b again indicate the brake forces and the compressed air consumption, and thus the function of the brakes of the system.

EXAMPLE III

To control the response stages of compressed air aggregates which are installed in the component being tested, to operate the braking system of the component being tested over a period of time under partial load, to test the compressed air braking system for leaks, to test (adjust or readjust) direct controlled compressed air aggregates (e.g. testing of spring storage cylinders individually for their spring force, or in parts for uniformity of their spring forces and their response), to determine leakage of automatic water-bleeding valves, to determine the operation of two-circuit protective valves, to set and control the operation of overflows valves, the fine adjustment of the pressure impulses which is possible by means of the spring valve 5 with spring centering arrangement 20, is employed.

For these tests only the air spring valve 5 is used, which is simple and reliable to operate and which is largely free of any maintenance requirements. The valves 6 and 6a are in closed and open position, respectively, at this time.

To test compressed-air aggregates especially two-circuit aggregates as components of compressed-air brake systems which have been dismounted from or installed in the vehicle and are to be separately tested, the apparatus according the present invention can also be utilized, employing merely simple auxiliary devices as shown in FIG. 5. FIG. 5 shows a two-circuit pressure device 33, further a two-circuit distributor branch 32 with connecting lines 30 and with coupling devices as well as a pair of intermediate connecting elements 30' with coupling devices. The device 33 is composed of two pressure containers 4a, 4b provided each with a coupling device 4a', 4b'. The containers 4a, 4b may have a desired working volume for example of 1.0 liters each. A first line 4a'' connects the container 4a with an outlet 34 to the atmosphere and has a blocking valve 6c interposed in it. A second line 4b'' connects the container 4b with the outlet 34 and has a blocking valve 6d interposed in it. The device 33 is provided with a double-manometer 8c having two individual manometers, one of which is connected via 4a''' to the container 4a and the other of which is connected via 4b''' to the container 4b. To facilitate the understanding of the construction and operation of the device 33 its use together with the apparatus of the present invention will now be described in connection with testing a two-circuit valve and a two-circuit brake valve.

The two-circuit valve of a two-circuit brake system is disposed intermediate the air compressor on the one side and two air tanks on the other side to block the air tanks against each other, in order to assure pressure in one air tank when the other becomes defective and in order to isolate the air tanks when the air compressor becomes inoperative. For testing such an indirect operating dual circuit protection valve its port for connecting the air compressor is to be connected with the connector 7 of the testing apparatus and its ports for connecting the air tanks (if necessary by means of the intermediate connecting elements 30') are to be connected with the coupling devices 4a', 4b' of the device 33. When compressed-air from the testing apparatus is admitted to the two-circuit valve to be tested the indicators of the both manometers of the double-manometer 8c will indicate the pressure in the two pressure containers 4a 4b or in the two-circuits 4a'', 4b'' respectively. By opening the blocking valve 6c the circuit 4a'' will be vented via the outlet 34 to the atmosphere and the indicator of the manometer of the double-manometer 8c related to this circuit 4a'' drops to zero. The circuit 4b'' can be tested analogously.

The two-circuit brake valve of the two-circuit brake system, for example a pedal operated valve, is disposed between the two air tanks on the one side and the two brake circuits independent from each other on the other side. For testing such a direct operating motor vehicle - dual circuit brake valve its ports for connecting the air tanks are to be connected with the coupling device on the two connecting lines 30 of the two-circuits distributor branch 32 and the third coupling device of the branch 32 is to be connected with the connector 7 of the testing apparatus and its ports for connecting the brake circuits are to be connected with the coupling device 4a', 4b' of the device 33. When operating the pedal of the valve and observing the pressure indication on the double-manometer 8c the functioning of the valve can be tested with regard to the pressure in the two pressure tanks 4a, 4b or in the two-circuits 4a''', 4b'' respectively.

It is advantageous if the testing apparatus of the present invention is provided also with arrangements for testing the electrical system of a vehicle, for example the operation of brake lights, back-up lights and direction-indicating lights, and perhaps the control of an electropneumatic brake valve or electrically operated switches of various types, and also to be able to test the response stage of air pressure switches and hydraulic pressure switches.

The device according to the present invention is very simple, as will have been seen from the foregoing description, and is easy to operate. The only relatively complicated component which it uses is the air spring valve 5 which is fine-adjustable and which is used only for a stepwise pressurizing and venting with air, whereas pressurizing of the air storage circuit of the component being tested, and the venting thereof, particularly the rapid venting to simulate emergency braking in case of loss of connection with an air pressure source, is effected via a simple blocking valve which is connected in parallel as part of a control arrangement.

The highly effective spring centering of the air spring valve 5 in zero position assures that the control pulses which are supplied to the component being tested are not influenced by the action of compressed air upon the air spring valve when the latter is in its zero position.

It will be understood that each of the elements described above, or two or more together, may also find a useful application in other types of construction differing from the types described above.

While the invention has been illustrated and described as embodied in a portable testing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a portable testing apparatus for testing of fluid-operated brake systems, particularly brake systems of land vehicles, a combination comprising a housing having a device for connection to a source of pressurized air; first and second connectors in said housing for connection to brake system lines; a compressed air tank in said housing; at least three double manometers on said housing; fluid couplings provided on said housing and connected with said manometers; a first fluid line connecting said air tank with said device and having a one-way valve and an adjustable pressure regulator interposed in it; a second fluid line connecting said air tank with said first connector; a third fluid line connecting said air tank with said second connector and having a one-way valve interposed in it; a multi-position manually operable air spring regulating valve interposed in said second line and having a valve body, an operating handle for moving said valve body between two operative end positions, and a centering-spring arrangement for centering said handle in a first position in which said valve body is in an intermediate blocking position; and a control arrangement in circuit with said air spring valve and connected with said air tank and first connector, said control arrangement including a one-way valve and a blocking valve intermediate said air tank and said first connector and another blocking valve intermediate said air tank and said second connector.

2. A combination as defined in claim 1, wherein said first connector is a coupling head with a built-in valve, and said second connector is a coupling head without a valve.

3. A combination as defined in claim 1, wherein said centering spring arrangement comprising a block rigidly connected to said housing, a member having one end portion connected to said handle and another bifurcated end portion embracing said block and being pivoted thereto for pivotal movement in a plane, and a pair of spring biased pressure plates which are in flush engagement with two surfaces of said block and two surfaces of said other end portion that extend normal to said plane, when said handle is centered in said rest position.

4. A combination as defined in claim 3, said other bifurcated end portion having two arms which define with one another two slots at opposite sides of said block; and wherein said pressure plates are each formed with a nose which projects into one of said slots.

5. A combination as defined in claim 3, said pressure plates each having a hole in which a bolt is mounted so as to have its opposite end section project outwardly beyond the respective pressure plates, and wherein said arrangement includes two centering springs each guided by one of said end sections and bearing against the associated pressure plate.

6. A combination as defined in claim 5, wherein said bolt has a center section; and further comprising a sleeve surrounding said center section of said bolt.

7. A combination as defined in claim 3, said block having an end face directed towards said bifurcated other end portion and bounded by two rounded edges which extend normal to the pivot axis of said member.

8. A combination as defined in claim 3; further comprising a bifurcated element connected to said handle, and a connecting member connecting said bifurcated element with said one end portion of said member.

* * * * *